Sept. 22, 1936. J. KUBLANOW Re. 20,116

SIDE WALL MOUNTING STRUCTURE

Original Filed Dec. 17, 1931 2 Sheets-Sheet 1

INVENTOR
Joseph Kublanow
by William B. Jaspert.
attorney.

SIDE WALL MOUNTING STRUCTURE
Original Filed Dec. 17, 1931 2 Sheets-Sheet 2
Fig. 4.
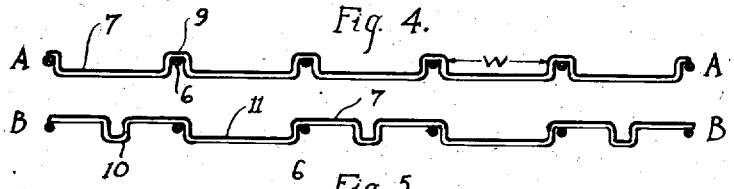
Fig. 5.
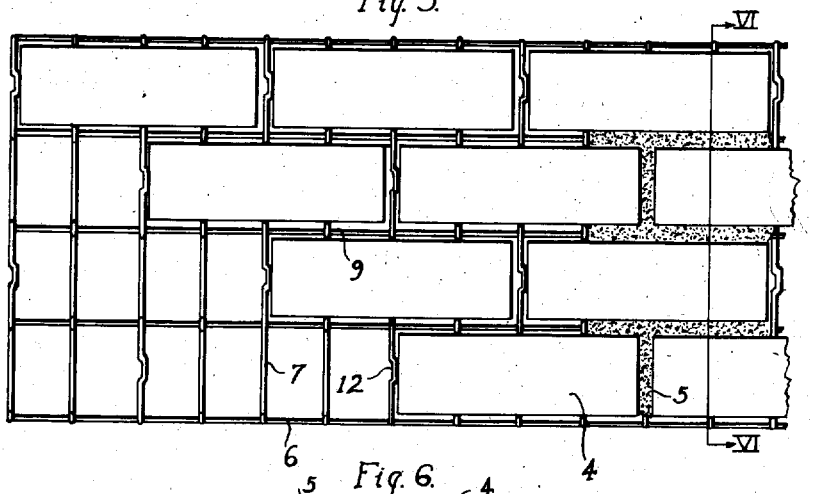
Fig. 6.
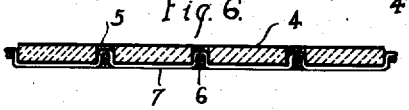
Fig 7.
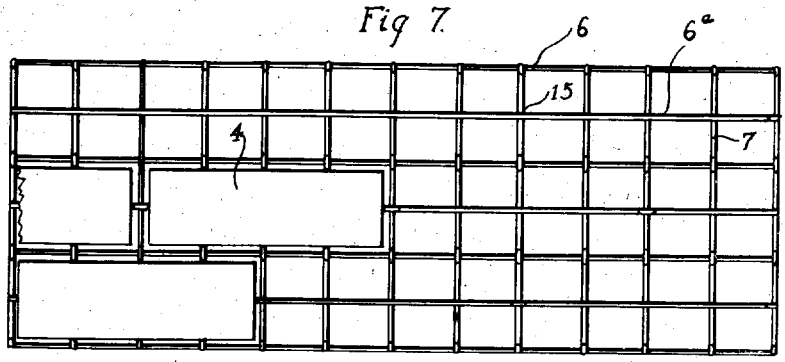
Fig. 8.
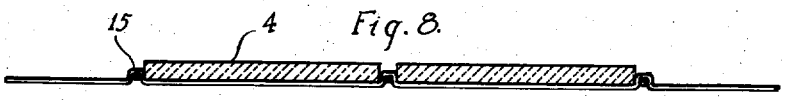
Fig. 9.
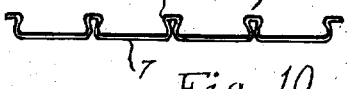
Fig. 10
INVENTOR
Joseph Kublanow
by William B. Jaspert
Attorney.

Reissued Sept. 22, 1936 Re. 20,116

UNITED STATES PATENT OFFICE 20,116

SIDE WALL MOUNTING STRUCTURE

Joseph Kublanow, Pittsburgh, Pa.

Original No. 1,932,274, dated October 24, 1933, Serial No. 581,625, December 17, 1931. Application for reissue April 20, 1935, Serial No. 17,459

21 Claims. (Cl. 72—24)

Figure 1:
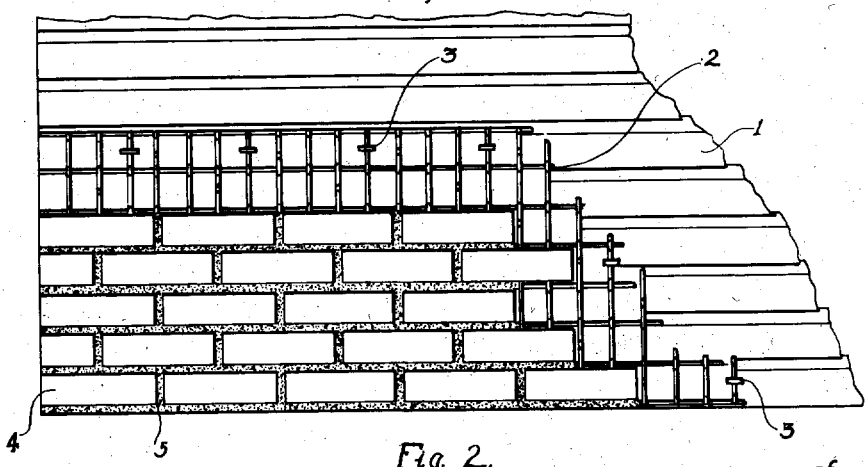

The invention relates to new and useful improvements in side wall structures for dwellings or the like and it is among the objects thereof to provide simple and efficient means for attaching brick veneer, tile or the like, to the side of either new or old buildings by means of mortar and reenforcing material.

It is among the objects of this invention to provide a strong and durable composite side wall structure of brick or tile veneer and reenforced concrete or mortar, the reenforcing material being initially employed as a simple means for effecting a preliminary mounting of the brick or tile in proper spaced relation to facilitate the application of the mortar to the joints, and subsequently acts as a reenforcing structure when the veneer has been secured in place.

Another object of the invention is the provision of a metal netting or mesh which shall be especially constructed to produce a proper spacing of the brick or tile veneer whereby the mortar joints are produced in staggered relation, and which shall function as a preliminary anchorage or fastening means for brick or tile before the mortar is applied to the joints.

A primary object of the invention is the provision of metal mesh or netting especially designed to facilitate its fabrication as by rolling or by die forming operations thereby rendering the product commercially practicable, and economical of construction.

Figure 2:
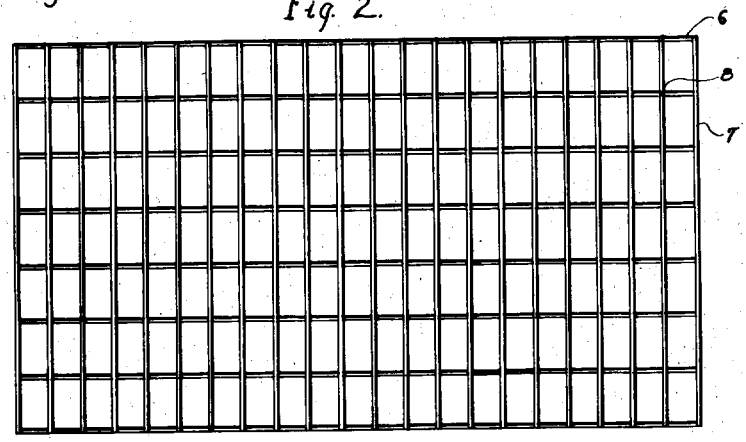
Figure 3:
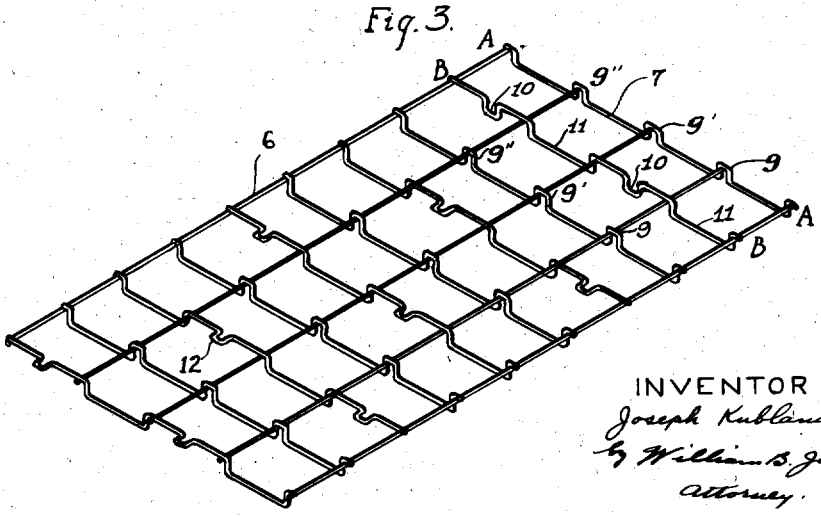

These and other objects of the invention will become more apparent from a consideration of the accompanying drawings constituting a part hereof in which like reference characters designate like parts and in which:

Figure 1 is a side elevational view of a portion of a side wall illustrating an embodiment of this invention in its various stages of application;

Figure 2 a top plan view of a blank form of metal mesh consisting of transversely disposed wires joined at their points of crossing as by welding or the like, and from which the combined veneer supporting and reenforcing element disclosed in Figure 3 is constructed, Figure 3 being a view in perspective of the metal mesh or netting after it has been subjected to the die forming operation;

Figures 4 and 5 are sectional elevational views respectively of different transverse strands of the mesh shown in Figure 3, Figure 4 illustrating the strand A—A of Figure 3, and Figure 5 the strand B—B of Figure 3;

Figure 6 an enlarged detail view of the die-formed metal mesh showing the veneer brick or tile in staggered and spaced relation as effected by the gripping portions of the mesh;

Figure 7 a cross sectional view of the assembled structures taken along the lines VI—VI of Figure 6;

Figure 8 a somewhat modified form of metal mesh adapted to hold the veneer brick or slabs at their ends as well as the sides to maintain them in proper spaced relation;

Figure 9 a cross-sectional view illustrating the longitudinal end-spacing elements of Figure 8; and, Figure 10 an elevational view of a modified form of the cross strands employed in the mesh structure.

With reference to Figure 1 of the drawings, the structure therein illustrated comprises the side wall 1 of a dwelling constituted of typical weather boards to which is applied a metal mesh generally designated at 2, the mesh being fastened to the side wall 1 by cleats 3 or other suitable fastening means. 4 designates relatively thin brick veneer which is applied to the side wall structure by placing them in gripping portions or pockets especially provided in the mesh reenforcing material, and 5 designates the concrete or mortar applied between the brick joints.

The mesh structure 2 is constructed from a blank as shown in Figure 2 consisting of longitudinal strands 6 of wire or rod and transverse strands 7 which are welded or otherwise fastened at their point of crossing designated at 8.

In Figure 2, the strands 6 and cross strands 7 are illustrated as of substantially the same cross-section but in practice it may be desirable to have either strand of greater cross-section than the other for reasons hereinafter stated.

After the blank shown in Figure 2 has been formed by welding or otherwise to join the cross strands, it is subjected to a die forming operation whereby the cross or transverse strands 7 are bent in the manner shown in Figure 3, such bending operation being produced in any suitable manner as by a rolling die or a pressing die. The cross strands 7 are shown in Figure 3 to be bent in two ways, some of them being distorted to provide a series of symmetrical off-set portions 9, 9′, 9″, etc. between adjacent ones of which the strand is formed to receive the width of the relatively thin slab or brick; and other strands such as shown in Figure 5 of the drawings, are constructed of alternate off-set members 10 and slab or brick engaging off-sets 11 which are in alinement with the brick engaging portions of the cross strands shown in Figure 4. The off-set portions 10 of the strands in Figure 5 may be either disposed in a horizontal plane as is illustrated at 12 in Figure 3 or they may be disposed vertically as shown in Figure 3. In either case, they act as spacing elements for the brick veneer to effect staggering of the joints as indicated in Figure 5 of the drawings.

With reference to Figures 4 and 5, it is to be noted that all of the cross strands 7 are so deformed as to employ the same length of wire or rod thereby enabling both cross strands to be formed in a single die forming operation and rendering the fabrication of the mesh less complicated. The dimension W between adjacent off-set members 9 shown in Figure 4 is precisely that of the width of the slab which is placed therein and may be somewhat less than the width of the slab so that the latter may be jammed in its seat to be supported by the mesh while the mortar is filled in the spacing joints.

As shown in Figure 5 of the drawings, the brick 4 which consists of a relatively thin slab, say one-half inch in thickness, is assembled in the reenforcing mesh after the latter has been fastened to the side wall, the brick 4 abutting with one of its end faces against the off-set 12 which constitutes the brick spacing element, and they are further held between the gripping projections 9 of the cross strands to firmly hold them in position until the mortar 5 is filled in between the brick joints.

The rolling of the mesh form is such that the spacing of the end abutments 12 will locate each brick in its proper place to present the conventional staggered appearance of the joints as shown in Figures 1 and 5 of the drawings, and by constituting the members 12 spacing abutments against which one of the end faces of the brick is placed, the mortar joints between adjacent brick will be of uniform width. The bends and off-sets of the transverse or cross strands 7 provide for accurate and proper spacing of the mortar joints between adjacent sides of the brick as shown in Figure 3.

When the relatively thin brick veneer or tile slabs have been assembled in the mesh forms or pockets, the tops or outer face of the brick will extend beyond the distorted portions of the mesh as shown in Figure 6 of the drawings, and the longitudinal strands 6 will run through the longitudinal mortar joints of the assembled brick while portions of the cross strands disclosed in Figure 5 will run through the transverse mortar joints, these strands constituting reenforcing for the mortar joints in which they are imbedded. The completed structure provides an interlocked metal reenforced side wall which is practically indestructible.

In Figures 7 and 8 of the drawings, an additional strand 6*a* is disposed between the longitudinal strands 6 of the mesh and this intermediate strand is provided with spacing abutments 15 which engage the respective ends of the brick veneer as shown. In this construction, the transverse strands 7 may be of the form of the strand shown in Figure 4 of the drawings, or it may be constructed so that it passes directly below the spacing abutments 15 to which it may be welded and then be depressed for the brick engaging portion of the strand between adjacent spacing members. The brick is disposed between the abutments 15 in the manner shown in Figure 8 and may be held along its side faces in the same manner shown in Figures 1 and 5 of the drawings.

In Figure 10 the cross strands 7 are shown to be slightly deformed in the shape of a bead 16 to produce a spring or clamping action when the brick slab is forced therebetween although the construction shown in the remaining figures of the drawings is sufficiently springy to provide a clamping engagement of the wire mesh with the brick.

In applying the above described side wall structure to the outer walls of dwelling houses, the wire may be produced in suitable width, say three or four feet, and of any desired length as it is capable of being handled in rolls and for this purpose the cross strands 7 may be of greater cross-section than the longitudinal strands 6 to prevent distortion of the gripping and spacing abutments.

The wire mesh is unrolled and applied to the side wall by fastening one end thereof and then stretching it if necessary to produce a level mortar joint. The wire mesh is held by the cleats 3 or other anchorage means to the side wall, and the relatively thin slabs 4 of brick or tile are inserted between the off-set abutments 9 which engage the side of the slab and the end abutment 12 or 15 which effect the proper longitudinal spacing of adjacent slabs to produce the staggered effect shown in Figure 5 or for that matter to produce any other desired staggering or distortion of the brick or tile material.

After some or all of the brick or tile members have been pressed into the gripping portions of the wire mesh, the mortar 5 consisting of regular cement or any suitable binding substance is applied by means of a feeding nozzle or with a trowel as desired, and the assembled structure will form a side wall which is strong and durable due to the wire reenforcing, which will not crack and which will produce the appearance of a conventional brick wall structure.

By means of the wire mesh for gripping and reenforcing the brick or tile veneer, the side wall structure can be applied with facility and dispatch in a very economical manner at a fraction of the cost of conventional brick wall structures, and although this form of side wall is particularly intended for remodeling old wooden dwelling houses, it may be utilized as an efficient and economical brick veneer structure for newly built dwelling houses. The construction lends itself to the forming of multi-colored brick wall since brick or tile of different colors may be assembled in any desired combinations.

Although a specific form of metal reenforcing has been herein illustrated and described, it will be obvious that metal structures of various forms may be employed so long as it is capable of spacing and holding the veneer and subsequently act as a reenforcing structure for the mortar and instead of assembling the veneer blocks in their respective pockets and filling in the mortar joints it is entirely feasible to apply a coating of mortar over the entire wall to which the mesh is applied and then press the veneer blocks into their respective pockets thereby causing the displaced mortar to be extruded between the joints.

I claim:

1. A metal mesh for spacing and reenforcing brick veneer side wall structures comprising a plurality of parallel strands having connecting strands disposed transversely thereof and joined thereto, some of said connecting strands having off-set portions constituting abutments for engaging the side faces of the brick and other of said connecting strands having off-set portions constituting end abutments for said brick, whereby the brick is held in uniformly spaced relation in horizontal planes and in staggered relation in vertical planes to form conventional mortar joints.

2. A structure for mounting brick veneer slabs and the like to side walls comprising a mesh fastened to the side of a wall having horizontally and vertically spaced off-set portions in spaced relation with said wall constituting pockets for receiving the individual veneer slabs, said horizontal off-set portions spacing the slabs to provide straight horizontal mortar lines, and said vertical off-set portions spacing the slabs to provide staggered vertical mortar lines.

3. A metal mesh for spacing and reenforcing brick veneer side wall structures, comprising a plurality of parallel strands having connecting strands disposed transversely thereof and joined thereto, said connecting strands having off-set portions constituting spacing abutments for the edges of the brick to uniformly hold the brick in spaced relation relative to the mortar line and to dispose portions of the strands as reenforcements in the mortar joints.

4. A wall structure comprising a base surface, mesh of transverse strands secured together at their points of intersection, certain of said strands being bent in directions perpendicular to the plane of the wall to cause some of said strands to lie in a plane spaced from said base surface, facing bricks between said bends, the bends being of such dimension as to maintain the horizontal edges of vertically adjacent brick in spaced relation to one another and to the horizontal strands, and to permit the embedment of the horizontal strands by mortar.

5. A composite sidewall structure consisting of wire mesh having portions of its strands in spaced relation and out of contact with the wall, another portion in intimate engagement with said wall, means for securing said mesh to the wall, brick slabs and mortar filling said mesh to constitute a brick veneering on said wall with strands of said mesh disposed in the mortar to constitute reinforcing with portions thereof disposed in the mortar joints between adjacent brick slabs.

6. A composite veneer slab wall structure comprising a base surface, slab spacing members secured to said base surface having openings exposing large portions of said base surface and having spacing abutments for maintaining mortar lines, veneer slabs disposed between said spacing abutments, and mortar filling the spaces between adjacent slabs, said slab spacing members being at least partially embedded in said mortar.

7. A composite veneer slab wall structure comprising a base surface, metal spacing and reinforcing mesh secured to said base surface having parallel strands and transverse spacing means for spacing the veneer slabs to maintain mortar lines, veneer slabs mounted on said mesh, and mortar filling the spaces between and behind adjacent slabs and interlocking said slabs and spacing mesh.

8. A composite reinforced wall structure comprising a base surface, parallel spacing members secured to said base surface, exposing large portions of said base surface and having transversely spaced off-set portions out of contact with said surface for maintaining mortar lines, veneer slabs disposed between the off-set portions of said spacing members, and mortar filling the spaces between adjacent slabs and between the off-set portions of the spacing members, said spacing members, veneer slabs and mortar constituting an interlocked unitary wall.

9. A frame or support for a brick or tile veneer wall comprising a plurality of parallel spaced backing members extending transversely of the longitudinal dimension of the finished frame, and a plurality of laterally spaced longitudinally extending members joined to the backing members and constituting a lattice frame, the longitudinal members being shaped to constitute spacing and holding elements for the side and end edges of bricks to be inserted between and supported by said frame, said spacing elements serving to hold the bricks apart to permit the insertion of mortar to cement the bricks and the frame into an integral unit.

10. A composite veneer slab wall structure comprising a base surface, a combined metal reinforcing and slab spacing structure secured to said base surface, having openings exposing large portions of said base surface and having spacing members for maintaining mortar lines, veneer slabs disposed between said spacing members, and mortar filling the openings in said slab spacing members and enveloping the back and sides of said veneer slabs, said slab spacing members being at least partially embedded in said mortar.

11. A mounting for tiles and the like, comprising a metallic assembly comprising a plurality of metal elements adapted for mounting in spaced relation on a surface to be tiled, with such spacing bearing a relation to a dimension of the slabs or tiles each element having thereon a series of resilient projections upstanding from the face thereof and cooperating with similar projections of adjacent spaced elements to define a tileway therebetween, whereby in assembly a tile is engaged in mounted position by abutment of its opposite edges against co-operating projections on adjacent mounted elements.

12. A mounting for slabs, tiles and the like, comprising a metallic assembly comprising a plurality of elements adapted when mounted to occupy a spaced relation on a surface to be tiled, with such spacing bearing a relation to a dimension of the slabs or tiles each element having thereon a series of spaced resilient projections upstanding from the face thereof and cooperating with similiar projections of adjacent spaced elements to define a tileway therebetween, whereby in assembly a tile is engaged in mounted position by abutment of its opposite edges against co-operating projections on adjacent mounted elements.

13. A frame or support for a brick or tile veneer wall comprising a wire structure having longitudinal and transverse members integrally joined and embodying as integral elements thereof laterally extending resiliently deformable portions to grip the side edges of brick slabs or tile and to hold them in proper spaced relation to permit the insertion of a body of cementing mortar between the brick slabs or tile.

14. An element for mounting and reinforcing a veneer wall, comprising a base member in substantially one plane to rest against and to be secured to a side wall to be covered, integral portions of said mounting element extending laterally forward from the base plane to provide and constitute resilient supports for receiving preshaped brick slabs or tile, and disposed to support such brick slabs or tile in spaced relation, other portions of said element being disposed in alignment with the spaces so established between the slabs when they are in position, whereby mortar when disposed between such brick slabs or tiles will cement the base members, the supports, and the brick or tile into a solid integral unit.

15. The method of covering a surface to be tiled, which consists in mounting a metallic supporting assembly on the surface to be tiled, with portions of the assembly spaced from said surface, and arranged to define tileways and mortar lines for the reception of tiles and mortar, in then inserting the tiles in fixed position in spaced echelon formation in the tileways between the portions of the supporting assembly, to present the appearance of a brick wall with staggered rows, and in then inserting mortar into the spaces between the tiles to surround and engage all the edges of the tiles or slabs and to embed portions of the supporting assembly engaging the tiles or slabs and to grip or interlock other portions of the assembly not engaged by the tiles or slabs, thereby to cement the supporting assembly and the tiles together as a solid integral unitary wall.

16. The method of forming a brick veneer wall which consists in applying a metallic lattice on a vertically positioned base wall, to serve as a supporting and reinforcing structure, then pressing a series of relatively thin brick slabs into position in said metallic lattice in the aligned positions to be occupied by the brick slabs in the finished wall; and then inserting mortar into the spaces between the brick slabs to surround the brick slabs and to embed or grip portions of the supporting structure whereby the lattice supporting structure shall constitute reinforcement for the mortar in the finished wall.

17. A support for a brick slab veneer wall comprising a metallic structure adapted to be secured in position where it is to be used, and embodying integrally joined elements extending laterally from the face of the metallic structure to grip the opposite side edges of the brick slabs to hold them in proper spaced relationship in situ, and also embodying portions adjacent and behind the spaces between the brick slabs, said portions being shaped or spaced to permit passage of cementing mortar relative thereto, whereby upon the insertion of a body of mortar between the slabs the mortar will cement the brick slabs to each other and to the integral elements and will form an interlock with the portions of the structure behind the spaces between the slabs thereby to cement the slabs and the supporting structure into an integral unit.

18. A support for a brick slab wall comprising a metallic structure having portions thereof in engagement with the wall and a portion thereof spaced from the wall, and embodying integral elements extending laterally forward from said spaced portions to provide and constitute resilient supports for receiving pre-shaped brick slabs, said integral elements serving to support such brick slabs in position by gripping the opposite edges of the brick slabs and holding them in spaced relation, and embodying further, other integral elements behind and accessible through the spaces between the the brick slabs, whereby mortar, when inserted into the spaces between the brick slabs, will cement the slabs to each other and will interlock with the integral portions behind the spaces between the brick slabs, thereby to cement the base, or supports, and the slabs into a solid integral unit.

19. The method of forming a brick veneer wall which consists in mounting a metallic supporting assembly on the surface to be covered, with portions of the assembly spaced from the surface and arranged to define tileways and mortar lines for reception of brick slabs or tiles and mortar, according to the width of the brick slab and the desired width of the mortar line, then pressing a series of relatively thin brick slabs or tiles into position between portions of the assembly and aligning and positioning them to occupy the ultimate positions which the slabs or tiles are to occupy in the finished wall, and in then inserting mortar into the spaces between the slabs or tiles to surround and engage all the edges of the slabs or tiles, and to embed portions of the supporting assembly in engagement with the slabs or tiles and to grip or interlock other portions of the assembly that are not in direct engagement with the slabs or tiles, thereby to cement the supporting assembly and the tiles together in a solid unitary wall.

20. A supporting assembly for maintaining brick slabs in definite spaced relationship to permit the application of mortar to the slabs and the supporting assembly to form a composite veneer wall covering said assembly comprising a plurality of supporting members having portions thereof extending laterally forward in spaced parallel rows to define a mortar line, contiguous rows of said extending portions being spaced according to the width of the brick slabs to be accommodated, and serving to grip the top and bottom edges of the slabs of the corresponding course, and portions within the boundaries of the mortar lines for interlocking with and reinforcing the mortar when it is inserted between the brick slabs, whereby the slabs and the supporting assembly are cemented together as a unitary wall structure.

21. A supporting structure for holding brick slabs in position until they may be cemented together to form a brick slab veneer wall, and for thereafter serving also to anchor a cementing mortar introduced between the slabs, said structure comprising laterally extending portions to grip and support the brick slabs in desired spaced relationship to maintain mortar lines, and further comprising non-gripping portions located within the boundaries of said mortar line spacings to anchor and reinforce the mortar when inserted between the slabs.

JOSEPH KUBLANOW.